United States Patent
Koo et al.

(10) Patent No.: US 9,711,794 B2
(45) Date of Patent: Jul. 18, 2017

(54) LITHIUM SECONDARY BATTERY HAVING ANODE CONTAINING AQUEOUS BINDER

(71) Applicant: LG Chem, Ltd., Seoul (KR)

(72) Inventors: Chang-Wan Koo, Daejeon (KR); Byoung Hoon Ahn, Daejeon (KR); Joon Sung Bae, Daejeon (KR); Jae Bin Chung, Daejeon (KR)

(73) Assignee: LG Chem, Ltd. (KR)

( * ) Notice: Subject to any disclaimer, the term of this patent is extended or adjusted under 35 U.S.C. 154(b) by 439 days.

(21) Appl. No.: 14/374,051

(22) PCT Filed: Feb. 7, 2013

(86) PCT No.: PCT/KR2013/000962
§ 371 (c)(1),
(2) Date: Jul. 23, 2014

(87) PCT Pub. No.: WO2013/122352
PCT Pub. Date: Aug. 22, 2013

(65) Prior Publication Data
US 2015/0030923 A1    Jan. 29, 2015

(30) Foreign Application Priority Data

Feb. 16, 2012 (KR) ........................ 10-2012-0015645

(51) Int. Cl.
| | | |
|---|---|---|
| *H01M 4/62* | (2006.01) | |
| *C09J 101/28* | (2006.01) | |
| *H01M 4/133* | (2010.01) | |
| *H01M 4/587* | (2010.01) | |
| *H01M 10/0525* | (2010.01) | |
| *H01M 4/583* | (2010.01) | |
| *H01M 10/052* | (2010.01) | |
| *H01M 4/505* | (2010.01) | |
| *H01M 4/525* | (2010.01) | |

(52) U.S. Cl.
CPC ......... *H01M 4/621* (2013.01); *C09J 101/286* (2013.01); *H01M 4/133* (2013.01); *H01M 4/583* (2013.01); *H01M 4/587* (2013.01); *H01M 10/052* (2013.01); *H01M 10/0525* (2013.01); *H01M 4/505* (2013.01); *H01M 4/525* (2013.01); *H01M 4/622* (2013.01); *H01M 2220/20* (2013.01); *Y02T 10/7011* (2013.01)

(58) Field of Classification Search
CPC ...... H01M 4/62; H01M 10/052; H01M 4/583; H01M 4/133; H01M 4/587; H01M 10/0525; H01M 4/621; H01M 4/525; H01M 4/505; H01M 4/622; C09J 101/286; C08L 9/06; Y02E 60/122; Y02T 10/7011
See application file for complete search history.

(56) References Cited

U.S. PATENT DOCUMENTS

| | | | |
|---|---|---|---|
| 6,423,447 B1 | 7/2002 | Ohsaki et al. | |
| 6,686,090 B2 | 2/2004 | Inagaki et al. | |
| 2006/0166093 A1 | 7/2006 | Zaghib et al. | |
| 2006/0194114 A1* | 8/2006 | Saito | H01M 4/131 429/232 |
| 2007/0059598 A1* | 3/2007 | Yang | B82Y 30/00 429/209 |
| 2011/0200886 A1* | 8/2011 | Deguchi | H01M 4/133 429/331 |
| 2012/0034505 A1* | 2/2012 | Zhu | H01M 4/133 429/94 |
| 2013/0034651 A1* | 2/2013 | Buqa | H01M 4/622 427/58 |

FOREIGN PATENT DOCUMENTS

| | | |
|---|---|---|
| JP | 11-111300 | 4/1999 |
| JP | 2005-005113 A | 1/2005 |
| JP | 2007-234348 A | 9/2007 |
| KR | 20090089581 A | 8/2009 |

OTHER PUBLICATIONS

EP,Decision_to_gra . . . n_patent,Sep. 3, 2015.*
KIPO decision to grant patent,Oct. 14, 2013.*
International Search Report for Application No. PCT/KR2013/000962 dated May 15, 2013.

* cited by examiner

*Primary Examiner* — Alex Usyatinsky
(74) *Attorney, Agent, or Firm* — Lerner, David, Littenberg, Krumholz & Mentlik, LLP (57) ABSTRACT

Disclosed is a lithium secondary battery that includes an anode coated with an anode mixture including an anode active material, a cathode coated with a cathode mixture including a cathode active material, and a non-aqueous electrolyte, wherein the anode mixture includes, as aqueous binders, carboxymethyl cellulose (CMC) having a degree of substitution of a hydroxyl group (—OH) with a carboxymethyl group (—CH$_2$CO$_2$H) of 0.7 to 1.2, a molecular weight (Mn) of 500,000 to 900,000, and a pH of 6.5 to 8.0 and styrene-butadiene rubber (SBR) having a particle diameter of 90 nm to 150 nm and a tensile strength of 90 kgf to 160 kgf, and the anode has an electrode coating amount of 10 to 20 mg/cm$^2$ and that enhances electrode processability and reduces a swelling phenomenon.

14 Claims, 6 Drawing Sheets

LITHIUM SECONDARY BATTERY HAVING ANODE CONTAINING AQUEOUS BINDER

TECHNICAL FIELD

The present invention relates to a lithium secondary battery including an anode including an aqueous binder and, more particularly, to a lithium secondary battery including an anode coated with an anode mixture including an anode active material, a cathode coated with a cathode mixture including a cathode active material, and a non-aqueous electrolyte, wherein the anode mixture includes, as aqueous binders, carboxymethyl cellulose (CMC) having a degree of substitution of a hydroxyl group (—OH) with a carboxymethyl group (—$CH_2CO_2H$) of 0.7 to 1.2, a molecular weight (Mn) of 500,000 to 900,000, and a pH of 6.5 to 8.0 and styrene-butadiene rubber (SBR) having a particle diameter of 90 nm to 150 nm and a tensile strength of 90 kgf to 160 kgf, and the anode has an electrode coating amount of 10 to 20 $mg/cm^2$.

BACKGROUND ART

In line with rapid increase in use of fossil fuels, demand for use of alternative energy or clean energy is increasing. Thus, the field of power generation and electricity storage, which use electrochemical reaction, is most actively studied.

As a representative example of electrochemical devices using electrochemical energy, secondary batteries are currently used and use thereof is gradually expanding.

Recently, as technology for portable devices, such as portable computers, portable phones, cameras, and the like, continues to develop and demand therefor continues to increase, demand for secondary batteries as energy sources is rapidly increasing. Among these secondary batteries, research on lithium secondary batteries having high energy density, high operating voltage, long cycle lifespan and low self-discharge rate has been underway and such lithium secondary batteries are commercially available and widely used.

In addition, as interest in environmental problems is increasing, research into electric vehicles, hybrid electric vehicles, and the like that can replace vehicles using fossil fuels, such as gasoline vehicles, diesel vehicles, and the like, which are one of the main causes of air pollution, is underway. As a power source of electric vehicles, hybrid electric vehicles, and the like, a nickel-metal hydride secondary battery is mainly used. However, research into lithium secondary batteries having high energy density and high discharge voltage is actively carried out and some lithium secondary batteries are commercially available.

Conventional lithium secondary batteries use graphite as an anode active material and charging and discharging processes are performed while lithium ions of a cathode are repeatedly intercalated into and deintercalated from an anode. Although there are differences in theoretical capacities of batteries according to kinds of electrode active materials, in most cases, charge and discharge capacities are deteriorated as cycles proceed.

Such phenomenon is mainly attributed to non-functioning of active materials due to separation of electrode active material components or separation between an electrode active material and a current collector by change in volume of an electrode occurring as charging and discharging of a battery proceed. In addition, in the intercalation and deintercalation processes, lithium ions intercalated into an anode are unable to be properly deintercalated therefrom and thus an anode active site is reduced and, accordingly, charge and discharge capacities and lifespan characteristics of a battery are deteriorated as cycles proceed.

In particular, to increase discharge capacity, when natural graphite having a theoretical discharge capacity of 372 mAh/g and a material having a high discharge capacity such as silicon, tin, Si—Sn alloy, or the like are used in combination, volume expansion of these materials significantly increases as charging and discharging proceed. Accordingly, an anode material is separated from an electrode material and, consequently, battery capacity is dramatically reduced as cycles are repeated.

Thus, there is an urgent need in the art to study a binder and an electrode material that may have strong adhesive strength so as to prevent separation between electrode active material components or separation between an electrode active material and a current collector when manufacturing an electrode and may have strong physical properties so as to achieve structural stability of an electrode by controlling volume expansion of an electrode active material caused as charging and discharging are repeated and, accordingly, enhance battery performance.

A conventional organic solvent-based binder, i.e., polyvinylidene fluoride (PVdF), does not meet such requirement and thus, recently, a method of using binders prepared by preparing emulsion particles by aqueous polymerization of a water-based binder such as styrene-butadiene rubber (SBR) and mixing the emulsion particles with a thickening agent and the like has been proposed and such binders are commercially available. These binders are eco-friendly and used in a small amount and thus may increase battery capacity.

However, an existing thickening agent such as carboxymethyl cellulose deteriorates battery processability due to difficulty in increasing solids of an electrode slurry while having high viscosity and stability. In addition, the thickening agent undergoes decomposition of a carboxyl group at high temperature and thus swelling in which an electrode assembly is inflated when left at high temperature occurs due to gases generated at high temperature.

Therefore, there is an urgent need to develop a lithium secondary battery including an aqueous binder that enhances overall characteristics of a battery, imparts structural stability to an electrode, and has high adhesive strength.

DISCLOSURE

Technical Problem

The present invention aims to address the aforementioned problems of the related art and to achieve technical goals that have long been sought.

As a result of a variety of extensive and intensive studies and experiments, the inventors of the present invention developed, as described below, a lithium secondary battery including an anode including CMC and SBR as aqueous binders that satisfy predetermined physical properties and confirmed that, when an anode including these aqueous binders is used in a secondary battery, battery processability may be enhanced and swelling may be reduced, thus completing the present invention.

Technical Solution

In accordance with one aspect of the present invention, provided is a lithium secondary battery including an anode coated with an anode mixture including an anode active material, a cathode coated with a cathode mixture including a cathode active material, and a non-aqueous electrolyte, wherein the anode mixture includes, as aqueous binders, carboxymethyl cellulose (CMC) having a degree of substitution of a hydroxyl group (—OH) with a carboxymethyl group (—CH$_2$CO$_2$H) of 0.7 to 1.2, a molecular weight (Mn) of 500,000 to 900,000, and a pH of 6.5 to 8.0 and styrene-butadiene rubber (SBR) having a particle diameter of 90 nm to 150 nm and a tensile strength of 90 kgf to 160 kgf, and the anode has an electrode coating amount of 10 to 20 mg/cm$^2$.

SBR as an aqueous binder is dispersed in water in the form of an emulsion and thus does not require use of an organic solvent. In addition, SBR has strong adhesive strength and thus is used in a reduced amount and increases the amount of an anode active material and thus is suitable to achieve high capacity of a lithium secondary battery. Here, CMC as a thickening agent added to adjust the viscosity of an anode active material generates gases at high temperature and thus, when an electrode assembly is left at high temperature, swelling occurs.

Since a lithium secondary battery according to the present invention includes CMC and SBR that satisfy predetermined physical properties, a ratio of an active material per volume may be increased and thus high capacity may be realized and, as confirmed by the following Experimental Examples, electrode processability may be enhanced due to increase in solid content of an anode slurry and swelling may be reduced.

In general, when an electrode coating amount of an anode is too great, resistance increases and thus, consequently, a rapid decrease in C-rate may be caused and thus, conventionally, an anode has an electrode coating amount of 13 mg/cm$^2$ or less.

By contrast, the inventors of the present invention confirmed that, when an anode aqueous binder that satisfies predetermined physical properties is used, deterioration of characteristics of a battery may be prevented even when an electrode coating amount is large and lifespan characteristics and the like of a battery are enhanced. The anode according to the present invention may have an electrode coating amount of 13 to 8 mg/cm$^2$. When the electrode coating amount is too small or too great, electrode processability may be deteriorated.

The anode may have an electrode density of 1.5 to 1.7 g/cc.

In one embodiment, CMC may have a degree of substitution of 0.9 to 1.1 and a molecular weight of 750,000 to 850,000, and a 1% aqueous solution thereof may have a pH of 7.5 to 8.0.

In another exemplary embodiment, SBR may have a particle diameter of 110 nm to 130 nm and a tensile strength of 100 kgf to 155 kgf.

An amount ratio of CMC to SBR may be 1:0.1 to 1:5 on a weight ratio basis.

The degree of substitution, molecular weight and pH of CMC, the particle diameter and tensile strength of SBR, and the amount ratio of CMC to SBR are optimum ranges to enhance electrode processability and to reduce swelling and, when outside the above-described ranges, desired effects may not be obtained.

The anode active material according to the present invention is not particularly limited and examples thereof include carbon and graphite materials such as natural graphite, artificial graphite, expandable graphite, carbon fiber, hard carbon, carbon black, carbon nanotubes, fullerene, and activated carbon; metals alloyable with lithium such as Al, Si, Sn, Ag, Bi, Mg, Zn, In, Ge, Pb, Pd, Pt, Ti, and the like and compounds including these elements; complexes of metals and compounds thereof and complexes of carbon and graphite materials; and lithium-containing nitrides. Among these, a carbon-based material is preferable. As a non-restrictive example, the carbon-based material may be at least one selected from the group consisting of graphite-based carbon, coke-based carbon, and hard carbon.

In addition, the graphite-based carbon may consist of spherical particles and be natural graphite having a degree of crystallinity in which an R value [R=I$_{1350}$/I$_{1580}$] (I$_{1350}$ is a Raman intensity around 1350 cm$^{-1}$ and I$_{1580}$ is a Raman intensity around 1580 cm$^{-1}$) of a Raman spectrum is 0.30 to 1.0.

Such natural graphite may be prepared into a spherical shape by pulverization and assembly of scaly natural graphite raw materials and the prepared spherical natural graphite has a minimized specific surface area and thus decomposition of an electrolyte at a surface of an active material may be reduced. Thus, when the spherized natural graphite is used in combination with scaly natural graphite, packing density of an electrode increases and energy density may be enhanced.

The anode active material according to the present invention constitutes an anode mixture selectively including a conductive material, a binder, a filler, and the like.

The conductive material is typically added in an amount of 1 to 30 wt % based on the total weight of a mixture including an anode active material. There is no particular limit as to the conductive material, so long as it does not cause chemical changes in the fabricated battery and has conductivity. Examples of conductive materials include graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives. Examples of commercially available conductive materials include acetylene black series such as products manufactured by Chevron Chemical or Denka black manufactured by Denka Singapore private limited, products manufactured by Gulf Oil, Ketjen black, EC series manufactured by Armak, Vulcan XC-72 manufactured by Cabot, and Super P manufactured by Timcal.

The anode binder is a component assisting in binding between an active material and a conductive material and in binding of the active material to a current collector. The anode binder may be typically added in an amount of 1 to 30 wt % based on a total weight of a mixture including an anode active material. As the anode binder, as described above, SBR and CMC that have predetermined physical properties are used.

The filler is used as a component to inhibit cathode expansion and is optionally used. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The anode mixture may be coated on a current collector to constitute an anode for secondary batteries. The anode may be manufactured by coating, on an anode current collector, a slurry prepared by mixing the anode mixture including an anode active material with a solvent such as NMP or the like and drying and pressing the coated anode current collector.

The anode current collector is typically fabricated to a thickness of 3 to 500 μm. The anode current collector is not particularly limited so long as it does not cause chemical changes in the fabricated battery and has conductivity. For example, the anode current collector may be made of stainless steel, aluminum, nickel, titanium, sintered carbon, aluminum or stainless steel surface-treated with carbon, nickel, titanium, or silver, or the like. The anode current collector may have fine irregularities at a surface thereof to enhance adhesion between the anode current collector and the anode active material. In addition, the anode current collector may be used in various forms including films, sheets, foils, nets, porous structures, foams, and non-woven fabrics.

Meanwhile, the cathode active material according to the present invention may be a lithium nickel-manganese cobalt oxide represented by Formula 1: $Li_aNi_xMn_yCo_zO_2$ where $0.8 \leq a < 1.2$, $0.2 \leq x < 1$, $0 < y < 1$, $0 < z < 1$, and $x+y+z=1$. Such a cathode active material has high capacity that is greater than that of a lithium cobalt oxide and higher structural stability than that of a lithium nickel oxide.

As the cathode active material, a lithium transition metal oxide represented by Formula 1 above may be used alone. As desired, other cathode active materials that enable intercalation and deintercalation of lithium ions may be used in combination.

Examples of other cathode active materials include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ where $0 \leq y \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-y}M_yO_2$ where M=Co, Mn, Al, Cu, Fe, Mg, B, or Ga, and $0.01 \leq y \leq 0.3$; lithium manganese composite oxides having the formula $LiMn_{2-y}M_yO_2$ where M=Co, Ni, Fe, Cr, Zn, or Ta, and $0.01 \leq y \leq 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; and $Fe_2(MoO_4)_3$.

In one exemplary embodiment, the cathode active material may further include $LiCoO_2$ in addition to the lithium transition metal oxide of Formula 1, and $LiCoO_2$ may be included in an amount of 20 wt % to 80 wt % based on a total weight of the cathode active material.

In this regard, the lithium transition metal oxide of Formula 1 exhibits high discharge capacity and thus may be included in an amount of at least 20 wt %, more particularly an amount of 20 wt % to 90 wt %, based on the total weight of the cathode active material.

The cathode may be manufactured by, for example, coating the cathode mixture including a cathode active material on a cathode current collector and drying the coated cathode current collector. As desired, the cathode mixture may include the above-described components.

Here, as a cathode binder, polytetrafluoroethylene (PTFE), polyvinylidene fluoride (PVdF), or the like may be used.

The cathode current collector is generally fabricated to a thickness of 3 to 500 μm. The cathode current collector is not particularly limited so long as it does not cause chemical changes in the fabricated battery and has high conductivity. For example, the cathode current collector may be made of copper, stainless steel, aluminum, nickel, titanium, sintered carbon, copper or stainless steel surface-treated with carbon, nickel, titanium, silver, or the like, or aluminum-cadmium alloys. Similar to the anode current collector, the cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The lithium secondary battery according to the present invention may also include a separator. The separator is disposed between the cathode and the anode and an insulating thin film having high ion permeability and mechanical strength is used as the separator. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as a separator.

A lithium salt-containing non-aqueous electrolyte is composed of an electrolyte and a lithium salt. As the electrolyte, a non-aqueous organic solvent, an organic solid electrolyte, an inorganic solid electrolyte, or the like may be used.

For example, the non-aqueous organic solvent may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

The lithium secondary battery according to the present invention may be used in a battery cell used as a power source of small devices and may also be used as a unit cell in a medium or large battery module including a plurality of battery cells used as a power source of medium and large devices.

Examples of the medium and large devices include, but are not limited to, electric motor-driven power tools; electric vehicles (EVs), hybrid electric vehicles (HEVs), and plug-in hybrid electric vehicles (PHEVs); electric two-wheeled vehicles such as E-bikes and E-scooters; and electric golf carts.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Now, the present invention will be described in more detail with reference to the accompanying drawings and the following examples. These examples are only provided for illustration of the present invention and should not be construed as limiting the scope and spirit of the present invention.

EXAMPLE 1

1-1 Fabrication of Anode

Carboxymethyl cellulose (CMC) as an aqueous binder having a degree of substitution of 1 and a molecular weight (Mn) of 800,000, a 1% aqueous solution of which has a pH of 7.83, and styrene-butadiene rubber (SBR) as an aqueous binder having a particle diameter of 120 nm and a tensile strength of 110 kgf were mixed. Subsequently, SBR, CMC, and natural graphite as an anode active material having a degree of crystallinity of 0.2 were mixed in a ratio of 1:1:98 to prepare an anode mixture slurry, the anode mixture slurry was coated onto a Cu current collector in an electrode coating amount of 13 mg/cm$^2$, and the coated resulting structure was dried in a vacuum oven at 120° C., thereby completing fabrication of an anode.

1-2 Fabrication of Cathode $LiNi_{1/3}Co_{1/3}Mn_{1/3}O_2$ as a cathode active material, natural graphite as a conductive material, and PVdF as a binder were mixed in a ratio of 96:2:2 to prepare a cathode mixture slurry, the cathode mixture slurry was coated on Al foil as a metal current collector, and the coated Al foil was dried in a vacuum oven at 120° C. for 2 hours or longer, thereby completing fabrication of a cathode.

1.3 Manufacture of Battery

An electrolyte containing 1 M $LiPF_6$ dissolved in a mixed solution of ethylene carbonate (EC) and dimethyl carbonate (DMC) in a volume ratio of 1:1 was injected into the cathode and the anode, thereby completing manufacture of a full cell.

EXAMPLE 2

A full cell was manufactured in the same manner as in Example 1, except that, when fabricating the anode, CMC, SBR, and natural graphite as an anode active material were mixed in a ratio of 1.0:1.5:97.5.

EXAMPLE 3

A full cell was manufactured in the same manner as in Example 1, except that, when fabricating the anode, CMC, SBR, and natural graphite as an anode active material were mixed in a ratio of 1.2:1.5:97.3.

EXAMPLE 4

A full cell was manufactured in the same manner as in Example 1, except that, when fabricating the anode, CMC having a degree of substitution of 1.1 and a molecular weight (Mn) of 800,000, a 1% aqueous solution of which has a pH of 7.85, was used.

EXAMPLE 5

A full cell was manufactured in the same manner as in Example 1, except that, when fabricating the anode, CMC, SBR, and natural graphite as an anode active material were mixed in a ratio of 1.2:1.5:97.3, and SBR having a tensile strength of 150 kgf was used.

EXAMPLE 6

A full cell was manufactured in the same manner as in Example 1, except that, when fabricating the anode, the anode mixture slurry was coated on a Cu current collector in an electrode coating amount of 15 mg/cm$^2$.

EXAMPLE 7

A full cell was manufactured in the same manner as in Example 1, except that, when fabricating the anode, the anode mixture slurry was coated on a Cu current collector in an electrode coating amount of 18 mg/cm².

Comparative Example 1

A full cell was manufactured in the same manner as in Example 1, except that, when fabricating the anode, CMC as an aqueous binder having a molecular weight (Mn) of 1,200,000 and SBR as an aqueous binder having a particle diameter of 200 nm and a tensile strength of 65 kgf were mixed.

Comparative Example 2

A full cell was manufactured in the same manner as in Example 1, except that, when fabricating the anode, CMC having a degree of substitution of 1.2 and a molecular weight (Mn) of 1,200,000 and SBR having a particle diameter of 200 nm and a tensile strength of 65 kgf were used, and CMC, SBR, and natural graphite as an anode active material were mixed in a ratio of 1.0:1.5:97.5.

Comparative Example 3

A full cell was manufactured in the same manner as in Example 1, except that, when fabricating the anode, CMC having a molecular weight (Mn) of 1,200,000 and SBR having a particle diameter of 200 nm and a tensile strength of 115 kgf were used, and CMC, SBR, and natural graphite as an anode active material were mixed in a ratio of 1.2:1.5:93.5.

Comparative Example 4

A full cell was manufactured in the same manner as in Example 3, except that, when fabricating the anode, SBR having a tensile strength of 85 kgf was used.

Comparative Example 5

A full cell was manufactured in the same manner as in Example 3, except that, when fabricating the anode, SBR having a tensile strength of 165 kgf was used.

Comparative Example 6

A full cell was manufactured in the same manner as in Example 3, except that, when fabricating the anode, SBR having a particle diameter of 80 nm and a tensile strength of 120 kgf was used.

Comparative Example 7

A full cell was manufactured in the same manner as in Example 3, except that, when fabricating the anode, SBR having a particle diameter of 160 nm and a tensile strength of 120 kgf was used.

Comparative Example 8

A full cell was manufactured in the same manner as in Comparative Example 1, except that, when fabricating the anode, the anode mixture slurry was coated on a Cu current collector in an electrode coating amount of 15 mg/cm².

Comparative Example 9

A full cell was manufactured in the same manner as in Comparative Example 1, except that, when fabricating the anode, the anode mixture slurry was coated on a Cu current collector in an electrode coating amount of 8 mg/cm².

Comparative Example 10

A full cell was manufactured in the same manner as in Comparative Example 1, except that, when fabricating the anode, the anode mixture slurry was coated on a Cu current collector in an electrode coating amount of 22 mg/cm².

Comparative Example 11

A full cell was manufactured in the same manner as in Comparative Example 1, except that, when fabricating the anode, the anode mixture slurry was coated on a Cu current collector in an electrode coating amount of 18 mg/cm².

Experimental Example 1

Solid contents of the anode mixture slurries in fabrication of the anodes manufactured according to Examples 1 to 5 and Comparative Examples 1 to 7 were measured. In addition, each of the anodes of Examples 1 to 5 and Comparative Examples 1 to 7 was pressed to a certain thickness, cut to a certain size, and fixed to a slide glass, and 180° peel strength of each anode was measured while peeling the current collector. Results are shown in Table 1 below. Evaluation was performed by measuring the peel strength of each anode at least five times and obtaining an average thereof.

TABLE 1

| | Solids of slurry (%) | Adhesive strength of anode (gf/cm) | Composition (CMC:SBR) | SBR size (nm) | SBR tensile strength (kgf) | CMC physical properties |
|---|---|---|---|---|---|---|
| Example 1 | 53 | 25 | 1:1 | 120 | 110 | Degree of substitution of 1.0 Molecular weight of 800k pH 7.83 |
| Example 2 | 52 | 30 | 1:1.5 | 120 | 110 | Degree of substitution of 1.0 Molecular weight of 800k pH 7.83 |
| Example 3 | 52 | 35 | 1.2:1.5 | 120 | 110 | Degree of substitution of 1.0 Molecular weight of 800k pH 7.83 |
| Example 4 | 52 | 34 | 1:1 | 120 | 110 | Degree of substitution of 1.1 Molecular weight of 800k pH 7.85 |
| Example 5 | 52 | 30 | 1.2:1.5 | 120 | 150 | Degree of substitution of 1.0 Molecular weight of 800k pH 7.83 |
| Comparative Example 1 | 46 | 15 | 1:1 | 200 | 65 | Degree of substitution of 1.0 Molecular weight of 1200k pH 7.83 |
| Comparative ative | 46 | 24 | 1:1.5 | 200 | 65 | Degree of substitution of |

TABLE 1-continued

| | Solids of slurry (%) | Adhesive strength of anode (gf/cm) | Composition (CMC:SBR) | SBR size (nm) | SBR tensile strength (kgf) | CMC physical properties |
|---|---|---|---|---|---|---|
| Example 2 | | | | | | 1.2<br>Molecular weight of 1200k<br>pH 7.83 |
| Comparative Example 3 | 46 | 30 | 1.2:1.5 | 200 | 115 | Degree of substitution of 1.0<br>Molecular weight of 1200k<br>pH 7.83 |
| Comparative Example 4 | 46 | 8 | 1.2:1.5 | 120 | 85 | Degree of substitution of 1.0<br>Molecular weight of 800k<br>pH 7.83 |
| Comparative Example 5 | 46 | 15 | 1.2:1.5 | 120 | 165 | Degree of substitution of 1.0<br>Molecular weight of 800k<br>pH 7.83 |
| Comparative Example 6 | 46 | 18 | 1.2:1.5 | 80 | 120 | Degree of substitution of 1.0<br>Molecular weight of 800k<br>pH 7.83 |
| Comparative Example 7 | 46 | 9 | 1.2:1.5 | 160 | 120 | Degree of substitution of 1.0<br>Molecular weight of 800k<br>pH 7.83 |

As seen in Table 1 above, it can be confirmed that the anodes of Examples 1 to 5 having predetermined physical properties exhibit higher adhesion than that of the anodes of Comparative Examples 1 to 7 and, in particular, solid contents in the anode slurries of the anodes of Examples 1 to 5 are increased and thus advantages of manufacturing processes are increased.

Experimental Example 2

Changes in voltage according to discharge time were measured by charging each of the full cells manufactured according to Example 3 and Comparative Example 3 at 0.2 C and discharging each full cell at 0.5 C. Results are shown in FIG. 1.

Figure 1:
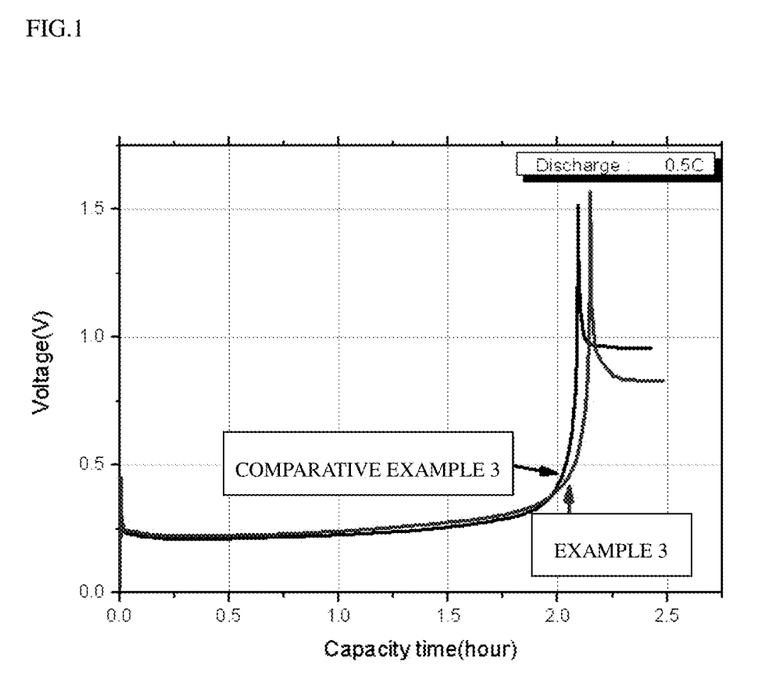
FIG. 1 is a graph showing measurement results of changes in voltage according to discharge time of secondary batteries manufactured according to Example 3 and Comparative Example 3, obtained in Experimental Example 2.
Figure 2:
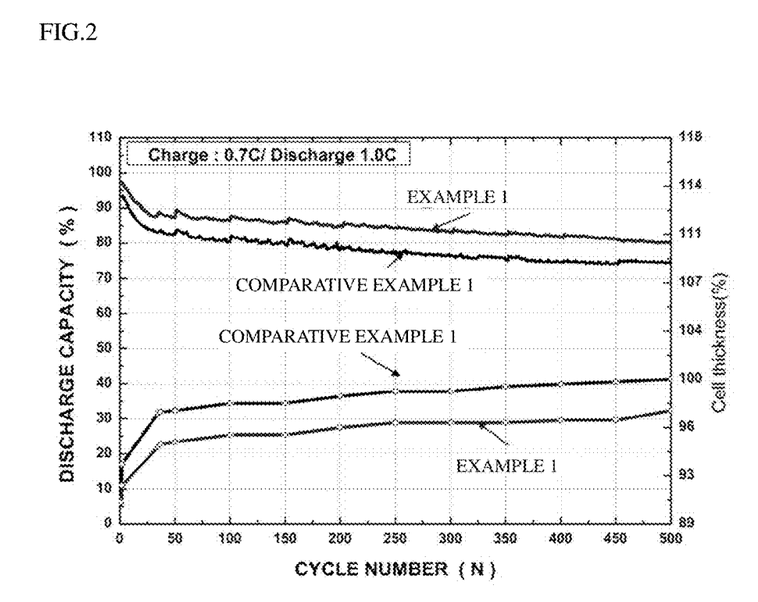
FIG. 2 is a graph showing lifespan characteristics and changes in thickness of secondary batteries manufactured according to Example 1 and Comparative Example 1, obtained in Experimental Example 3.
Figure 3:
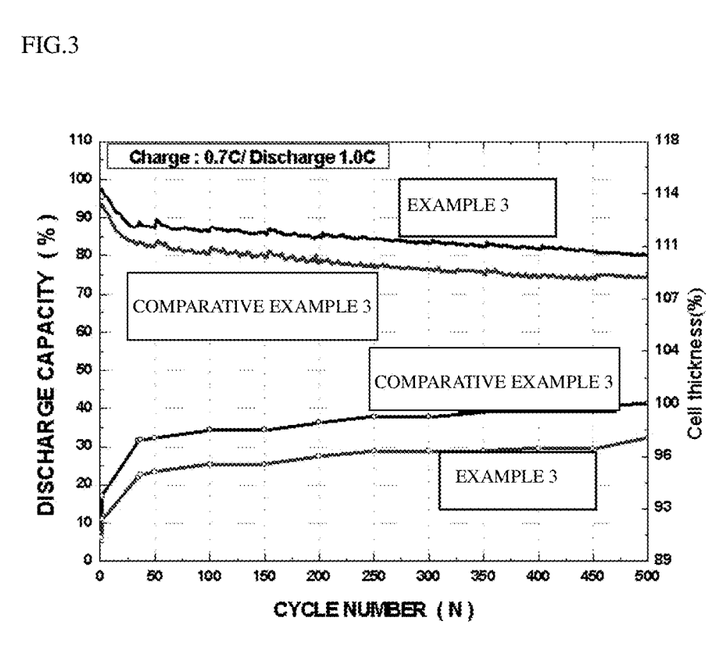
FIG. 3 is a graph showing lifespan characteristics and changes in thickness of the secondary batteries of Example 3 and Comparative Example 3, obtained in Experimental Example 3.
Figure 4:
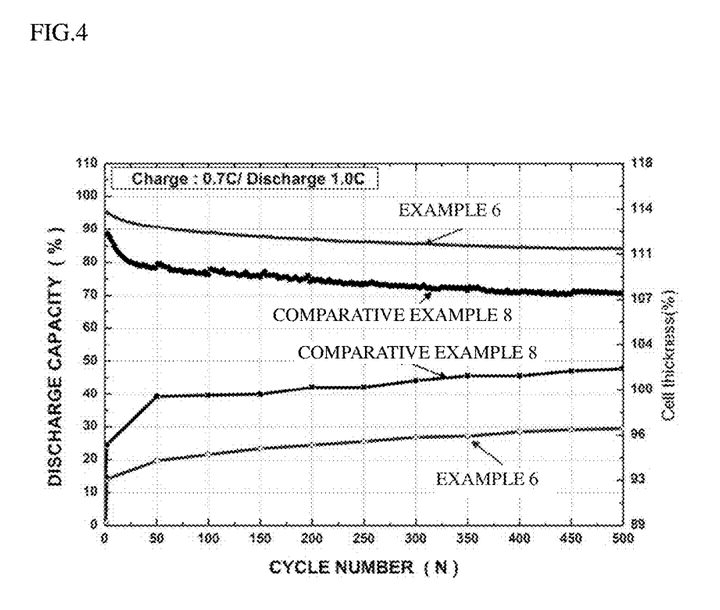
FIG. 4 is a graph showing lifespan characteristics and changes in thickness of secondary batteries manufactured according to Example 6 and Comparative Example 8, obtained in Experimental Example 3.
Figure 5:
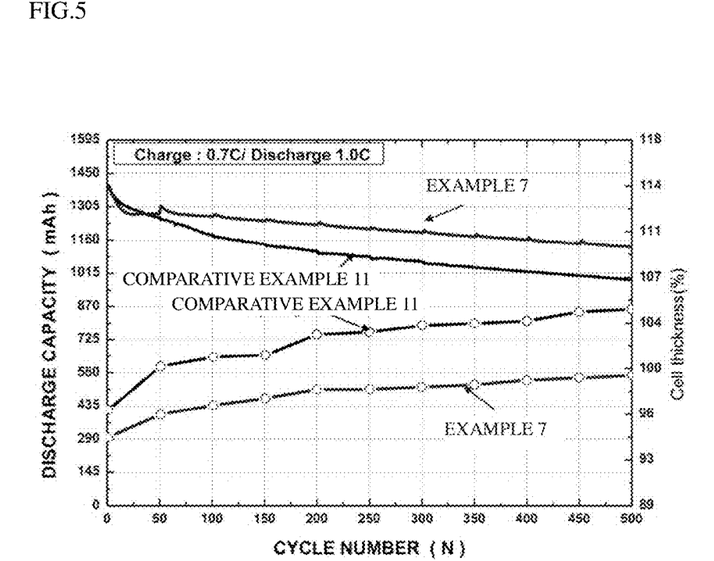
FIG. 5 is a graph showing lifespan characteristics and changes in thickness of secondary batteries manufactured according to Example 7 and Comparative Example 11, obtained in Experimental Example 3.
Figure 6:
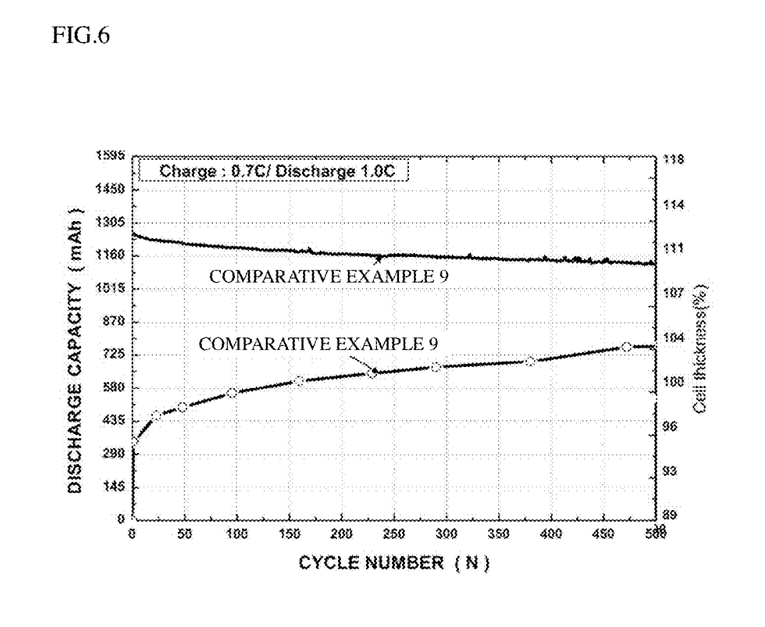
FIG. 6 is a graph showing lifespan characteristics and changes in thickness of a secondary battery manufactured according to Comparative Example 9, obtained in Experimental Example 3.
Figure 7:
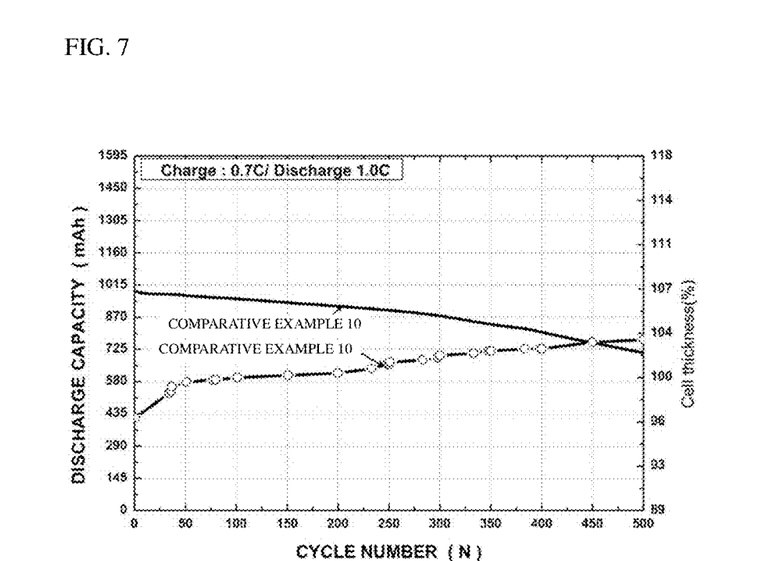
FIG. 7 is a graph showing lifespan characteristics and changes in thickness of a secondary battery manufactured according to Comparative Example 10, obtained in Experimental Example 3.

As shown in FIG. 1, it can be confirmed that the coin half-cell of Example 3 has lower resistance than that of the coin half-cell of Comparative Example 3. This is assumed to be because, due to increase in solid content of an anode slurry, impregnation of an electrolyte into an electrode smoothly occurs as the density of an electrode active material increases and thus lithium ions actively move in the electrode, and lithium ions rapidly move at a surface of an anode active material having a high degree of surface amorphization and thus resistance against movement of ions at the surface of the active material is low.

Experimental Example 3

Changes in voltage according to the number of cycles and changes in thickness of each of the full cells manufactured according to Examples 1, 3, 6 and 7 and Comparative Examples 1, 3, 8, 9, 10 and 11 were measured by performing charging and discharging at 0.7 C and 1.0 C, respectively. Results are shown in FIGS. 2 to 7.

As illustrated in FIGS. 2 to 7, it can be confirmed that the full cells of the examples exhibit superior cycle characteristics to and less increase in thickness than those of the full cells of the comparative examples.

INDUSTRIAL APPLICABILITY

As described above, a lithium secondary battery according to the present invention includes an anode including, as aqueous binders, CMC and SBR that satisfy predetermined physical properties and, accordingly, electrode processability may be enhanced and swelling may be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lithium secondary battery comprising an anode coated with an anode mixture comprising an anode active material, a cathode coated with a cathode mixture comprising a cathode active material, and a non-aqueous electrolyte,
   wherein the anode mixture comprises aqueous binders,
   wherein the aqueous binders comprise a carboxymethyl cellulose (CMC) and a styrene-butadiene rubber (SBR),
   wherein the CMC has a degree of substitution of a hydroxyl group (—OH) with a carboxymethyl group (—CH$_2$CO$_2$H) of 0.7 to 1.2, a molecular weight (Mn) of 500,000 to 900,000, and a pH of 6.5 to 8.0 in a 1% aqueous solution,
   wherein the SBR has a particle diameter of 90 nm to 150 nm and a tensile strength of 90 kgf to 160 kgf, and
   wherein the anode has an electrode coating amount of 10 to 20 mg/cm$^2$.

2. The lithium secondary battery according to claim 1, wherein the electrode coating amount of the anode is 13 to 18 mg/cm$^2$.

3. The lithium secondary battery according to claim 1, wherein the degree of substitution of the CMC is 0.9 to 1.1.

4. The lithium secondary battery according to claim 1, wherein the molecular weight of the CMC is 750,000 to 850,000.

5. The lithium secondary battery according to claim 1, wherein the pH of the CMC is 7.5 to 8.0.

6. The lithium secondary battery according to claim 1, wherein the particle diameter of the SBR is 110 nm to 130 nm.

7. The lithium secondary battery according to claim 1, wherein the tensile strength of the SBR is 100 kgf to 155 kgf.

8. The lithium secondary battery according to claim 1, wherein an amount ratio of the CMC to the SBR is 1:0.1 to 1:5 on a weight ratio basis.

9. The lithium secondary battery according to claim 1, wherein the anode active material is a carbon-based material.

10. The lithium secondary battery according to claim 9, wherein the carbon-based material is at least one selected from the group consisting of graphite-based carbon, coke-based carbon, and hard carbon.

11. The lithium secondary battery according to claim 10, wherein the graphite-based carbon comprises spherical particles and is natural graphite having a degree of crystallinity in which an R value [$R=I_{1350}/I_{1580}$] ($I_{1350}$ is a Raman intensity around 1350 cm$^{-1}$ and $I_{1580}$ is a Raman intensity around 1580 cm$^{-1}$) of a Raman spectrum is 0.30 to 1.0.

12. The lithium secondary battery according to claim 1, wherein the cathode active material comprises a lithium nickel-manganese cobalt oxide represented by Formula 1 below:

$$Li_aNi_xMn_yCo_zO_2 \qquad (1)$$

wherein $0.8 \le a < 1.2$, $0.2 \le x < 1$, $0 < y < 1$, $0 < z < 1$, and $x+y+z=1$.

13. A battery module comprising the lithium secondary battery according to claim 1 as a unit cell.

14. A battery pack comprising the battery module according to claim 13.

* * * * *